Oct. 1, 1963 W. D. LATHROP ETAL 3,105,262
TAPE FINISHING TOOLS FOR CORNERS
Filed April 26, 1960 2 Sheets-Sheet 2

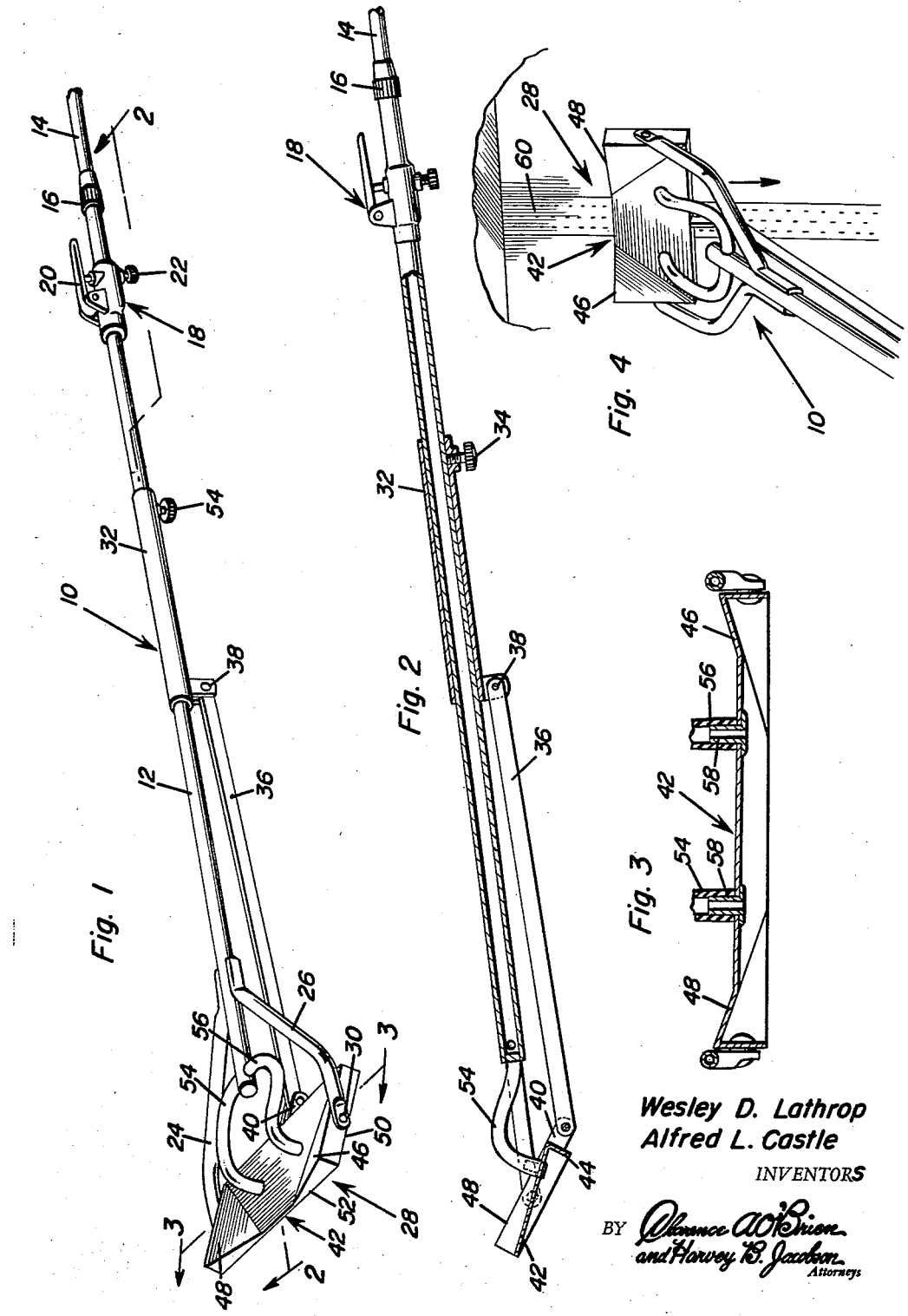

Wesley D Lathrop
Alfred L Castle
INVENTORS

United States Patent Office 3,105,262
Patented Oct. 1, 1963

3,105,262
TAPE FINISHING TOOLS FOR CORNERS
Wesley D. Lathrop and Alfred L. Castle, Goleta, Calif., assignors to Lathrop-Castle Enterprises, Inc., Goleta, Calif., a corporation of California
Filed Apr. 26, 1960, Ser. No. 24,756
2 Claims. (Cl. 15—235.7)

This invention relates generally to equipment for use in conjunction with wallboards, and more particularly to tools for wiping and smoothing mud applied over tape on wallboard joints.

In wallboard construction, shallow recesses are generally formed adjacent the edges of each wallboard. When wallboards are placed together, the two recesses form a trough or groove adjacent the joint. Of course, the joint may extend either vertically or horizontally and may be flat or a corner joint. A mastic or mud is conventionally applied to the joint in the shallow recesses, with tape being applied above the first mastic layer. A second layer of mastic is generally laid on the tape and the edges of the second layer extend beyond the sides of the trough or groove. Tools are necessary to apply the second mastic layer and to feather the edges thereof so as to gradually merge the second layer into the exterior surface of the wallboard.

In a copending application, Ser. No. 24,967, filed April 27, 1960, the applicants therein disclose apparatus for simultaneously applying tape and a first layer of mud to the wallboard joint. Herein, applicants disclose tools for applying a second mastic layer and for wiping down the applied mastic or mud.

It is a further object of this invention to provide novel tool constructions which are light weight, durable and relatively simple in construction. The disclosed devices have proved to be extremely satisfactory in use, and due to their relative simplicity are of a relatively low expense.

It is a more particular object of this invention to provide a novel tool for use in conjunction with wallboard constructions wherein the tool serves to bed tape into an angle or corner joint and to plow or wipe down excess mud.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of a tool used for applying and distributing mud onto a wallboard joint;

FIGURE 2 is a sectional view taken substantially along the plane 2—2 of FIGURE 1;

FIGURE 3 is a sectional view taken substantially along the plane 3—3 of FIGURE 1;

FIGURE 4 is a perspective view illustrating how the tool may be utilized to apply a layer of mud over a flat wallboard joint;

Figure 5:
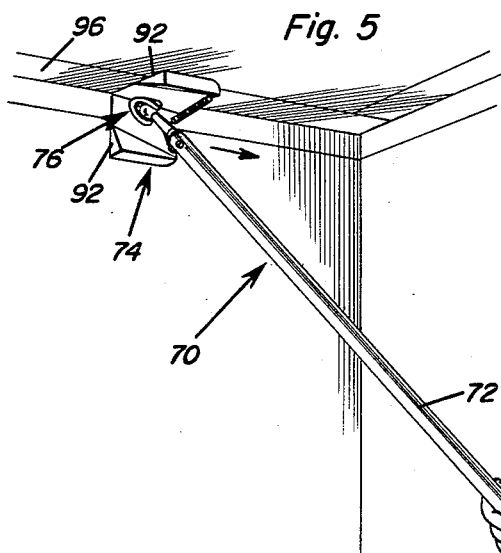
FIGURE 5 is a perspective view of the angle plow construction showing how the tool may be utilized.
Figure 6:
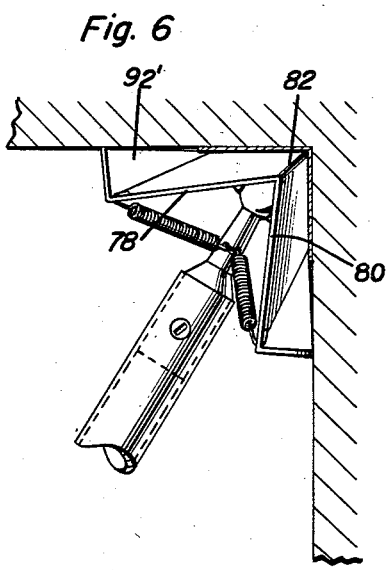
FIGURE 6 is a front end view of the angle plow illustrating how the head thereof is received in the angle or corner joint.

With continuing reference to the drawings, initial attention is called to the non-elected embodiment of the invention illustrated in FIGURES 1 through 4. Therein, a finishing tool 10 is provided including a tubular handle 12 to which may be connected a mud hose 14 by hose connector 16. Mud may be pumped from a supply hopper through the hose 14 and connection 16 into the tubular handle 12. A valve 18 may be operatively interposed between the tubular handle 12 and hose 14. The valve 18 may include a control handle 20 and adjustment screw 22 for enabling the operator of the tool 10 to control the mud flow through the tubular handle 12.

A pair of forwardly extending arms 24 and 26 pivotally support a tool head 28 therebetween, as by pins 30. The head 28 is substantially rectangular in shape. A collar 32 is slidable on the tubular handle 12 and is provided with a set screw 34 for locking the collar 32 to the tubular handle 12 in any desired position. A connecting rod 36 is pivoted between pin 38 secured to the collar 32 and bifurcated member 40 secured to the head 28. It will be appreciated that by sliding the collar 32 on the handle 12, the head 28 will be pivoted on the pins 30 inasmuch as the pivotal connection between the rod 36 and bifurcated member 40 is spaced from the rotational axis through pins 30.

As noted, the perimeter or outline of the head 28 is rectangular. The head 28 defines a flat central surface 42 of trapezoidal shape having shorter and longer parallel sides and non-parallel sides. The central surface 42 is folded along its longer parallel side as indicated by numeral 44 and so defines a leading edge. Wing surfaces 46 and 48 diverge and terminally extend from the non-parallel sides of the central surface 42. The wings 46 and 48 each are folded at their outer edges 50 and trailing edges 52. The folded edges 50 and 52 are perpendicular to each other, while the edge 50 extends perpendicularly to the defined edge 44. Each of the wing surfaces 46 and 48 defines a pocket with its folded edges 50 and 52.

Mud tubes 54 and 56 extend from the tubular handle 12 and are received on nipples 58 mounted on the central trapezoidal surface 42.

A single operator may use the tool 10 in the manner indicated in FIGURE 4. As noted, mud is pumped under pressure through the hose 14 and tubular handle 12 controlled by the valve 18. The head 28 of the tool 10 is placed against the joint of adjacent wallboards over the applied tape 60. Mud is discharged through the tubes 54 and 56 and nipples 58 between the central surface 42 and the tape 60. The pockets defined by the wing surfaces and their folded edges contain the backflow of the mud. The head 28 is moved downwardly along the wallboard joint and mud is smoothed over the tape 60 as by the edge of the smaller side of the central trapezoidal surface 42. The head acts with shearing effect to feather the edges of the seams between the mud and wallboard.

Attention is now drawn to the angle plow 70 comprising the second and preferred embodiment of the invention illustrated in FIGURES 5 through 9. Therein, an elongated handle 72 has a wiping head 74 connected thereto as by a swivel ball connection 76.

Figure 7:
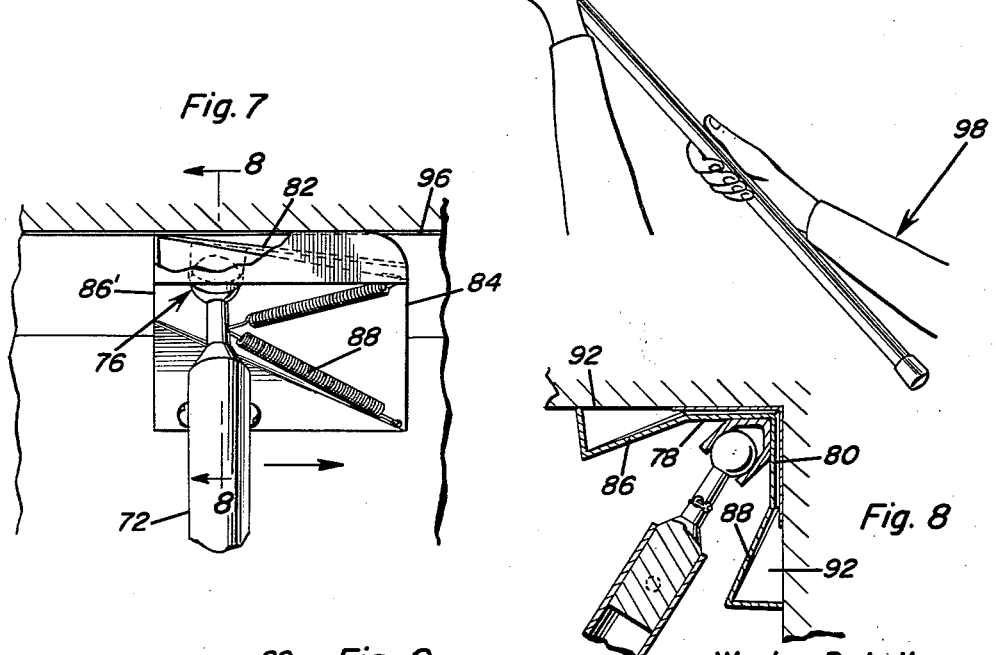
FIGURE 7 is a side edge elevational view with portions broken away of the angle plow head in use.
Figure 8:
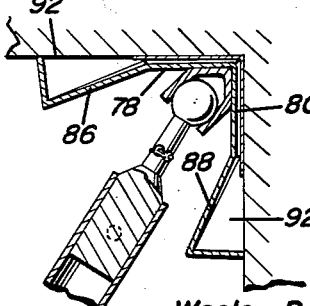
FIGURE 8 is a sectional view taken substantially along the plane 8—8 of FIGURE 7.
Figure 9:
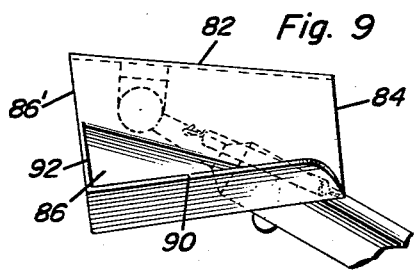
FIGURE 9 is a side elevational view of the angle plow head.

The wiping head 74 includes a pair of flat surfaces 78 and 80 which converge and so define a vertex line 82. The surfaces 78 and 80 define leading edges 84 and trailing edges 86'. The swivel ball connection 76 is positioned closer to the trailing edge 86' than leading edge 84. Springs 88' extend from the forward portions of the front surfaces 78 and 80 to the handle 72 as best illustrated in FIGURE 7.

Extending from each of the flat surfaces 78 and 80 are wing surfaces 86 and 88 which are folded at their outer edges 90 and trailing edges 92. The wing surfaces 86 and 88 together with the outer and trailing edges 90 and 92 define pockets 92' therein. It is to be noted that the trailing edge 92 of the wing surfaces 86 and 88 extend substantially in a line with the trailing edge 86' of the flat surfaces 78 and 80.

In use, the angle plow is forced into an angle or corner joint as between wall and ceiling as indicated in FIGURE 5. Tape 96 has previously been applied to the joint and a layer of mud has been applied thereover. It is necessary to both properly bed the tape 96 in the corner joint and wipe down the excess mud. For this purpose, the angle plow head 74 is moved in the direction of the arrows shown in FIGURES 5 and 7. The operator 98 grasps the handle 72 and bears on the handle so as to force the swivel ball joint 76 into the corner joint formed by the wall and ceiling. Inasmuch as the ball joint 76 is positioned closer to the trailing edge 86', the vertex line 82 will engage the corner joint near the trailing edge. The springs 88' serve somewhat to carry the leading edge 84 away from the joint and incline the vertex line 82 as is particularly indicated in FIGURE 7. The folded trailing edges 92 of the wing surfaces 86 and 88 will wipe against the perpendicular wall and ceiling surfaces. The excess mud will be collected in the pocket formed by the wing surfaces and folded edges. The vertex line 82 bears against the tape and properly beds it in the angle joint while the trailing edges 92 will properly feather the applied mud.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An angle plow tool for use in conjunction with the application of mud to wallboard joints comprising an elongated handle, a unitary wiping head having trailing and leading edges fixed thereto pivotally and terminally mounted on said handle, said head defining a pair of intersecting flat converging surfaces defining a central vertex line, said pivotal connection between said handle and said head disposed closer to said trailing than leading edge, spring means connected between said handle and wiping head urging said leading edge toward said handle and urging said trailing edge away from said handle.

2. A wallboard joint tool for trowelling mortar on a wall comprising an elongated handle, a head movably connected to one end of said handle, said head comprising a central section inclined to the surfaces of the wall, wings connected to the side edges of the central section and inclined away from the central section and wall, said wings terminating in side flanges extending to the wall surfaces, a rear flange on each side of the center section connected between one of the side flanges and a rear edge of the wings, said center section having at least one rear edge lying in a plane defined by a lower edge of one of said side flanges and one of said rear flanges, said wings and flanges defining pockets for receiving and retaining mortar trowelled from said wall by said central section, said handle being connected to said head adjacent its rear edge, tension spring means connected between said handle and a leading edge of said head, said spring means urging said leading edge toward said handle and said rear edge away from said handle.

References Cited in the file of this patent
UNITED STATES PATENTS

| | | |
|---|---|---|
| 988,457 | Glasscock | Apr. 4, 1911 |
| 1,999,367 | McCorkle | Apr. 30, 1935 |
| 2,420,062 | Ames | May 6, 1947 |
| 2,436,783 | Ames | Mar. 2, 1948 |
| 2,608,853 | Schrepper | Sept. 2, 1952 |
| 2,824,443 | Ames | Feb. 25, 1958 |